United States Patent [19]

Kubinak

[11] 4,122,533

[45] Oct. 24, 1978

[54] MULTIPLE LANGUAGE CHARACTER GENERATING SYSTEM

[75] Inventor: Ronald Arthur Kubinak, Edison, N.J.

[73] Assignee: Addressograph-Multigraph Corporation, Los Angeles, Calif.

[21] Appl. No.: 802,895

[22] Filed: Jun. 2, 1977

[51] Int. Cl.[2] .............................................. G03B 15/00

[52] U.S. Cl. ............................ 364/900; 340/324 AA; 354/7

[58] Field of Search ... 364/200 MS File, 900 MS File; 354/5, 7, 10, 11, 12; 340/324 R, 324 A, 365 R, 365 S; 35/35 R, 35 C

[56] References Cited

U.S. PATENT DOCUMENTS

| | | | |
|---|---|---|---|
| 3,726,193 | 4/1973 | Ishii | 354/11 |
| 3,754,459 | 8/1973 | Coleman et al. | 354/7 |
| 3,959,800 | 5/1976 | Friedel | 354/5 |
| 3,968,501 | 7/1976 | Gilbert | 354/7 |

*Primary Examiner*—Leo H. Boudreau
*Attorney, Agent, or Firm*—Harry M. Fleck; Sol L. Goldstein; Robert S. Hulse

[57] ABSTRACT

A character generating system is provided for a photocomposition machine to display alpha/numeric symbols on a CRT for any language selected from a group of languages. The system includes a character generator memory for each symbol and control means which selects a predetermined set of memories for each language in a manner that symbols common to two or more languages are provided from the same character generator memory, whereby the total memory required for all symbols of the group of languages is minimized.

17 Claims, 5 Drawing Figures

MULTIPLE LANGUAGE CHARACTER GENERATING SYSTEM

BACKGROUND OF THE INVENTION

The present invention is generally related to phototypesetting and, more particularly, to an improved photocomposition machine with multiple language display capabilities.

In recent years, various photocomposition machines have been proposed or manufactured, many of which provide highly versatile control through the use of microprocessors and the like. Several such machines include video display screens for the operator. The one such photocomposition machine as disclosed by U.S. Pat. No. 3,968,501 for *PHOTOCOMPOSITION MACHINE WITH IMPROVED LENS CONTROL SYSTEM* to Barry D. Gilbert and assigned to the assignee of the present invention. The patented machine includes an operator display screen in the form of a CRT which displays various alpha/numeric character symbols selected by the operator. This provides the operator with a visual record of his entries for several lines of the text. Each character symbol is displayed in the form of a dot pattern on the CRT, which pattern is defined by signals from a character generator circuit associated with a microprocessor control. Each dot pattern is defined by data stored in memory associated with the character generator.

It has been proposed that photocomposition machines of this type be provided with a multiple language capability for use in Europe and other parts of the world where different languages are commonly spoken in relatively small bordering countries. This would allow a single photocomposition machine to be used for several languages. However, since many alpha/numeric characters differ between many languages, display of the character symbols by conventional means would require separate character generators and memories for each language. Such presents a very significant cost factor, particularly in view of the large memory required, if the machine is to handle several different languages, as would be necessary for the European countries. In addition, the standard keyboard formats vary in many cases from one language to another. As such, it would be desirable, if not necessary, that such a multiple language photocomposition machine have the ability to provide the appropriate keyboard format for each language selected by the operator.

SUMMARY OF THE INVENTION

The present invention provides an improved photocomposition machine with a versatile control for displaying symbols of any one of several selectable languages, yet without duplicating the character generators and associated memory for each language. This is achieved by providing a single library of data for all symbols of the languages, with data for each symbol stored in memory at predetermined address locations. Thus, a symbol common to two or more languages is stored in the same memory and shared by the various languages requiring that symbol.

The control includes a group of directory memories or the like which, in effect, select a predetermined set of symbols (memory addresses) in accordance with the particular language selected by the operator. Additional directory memories are utilized to relate each operator key with a particular symbol in accordance with the selected language whereby an appropriate keyboard format is provided for that language. This also relates each key with a position of the optical character storage disc.

It is a primary object of the present invention to provide a versatile photocomposition machine which may be operated for composition in any one of several different languages readily selectable by the operator.

Another object of the present invention is to provide a photocomposition machine with a unique control system for displaying character symbols of several selectable languages, whereby a single machine may be used for photocomposition in any one of several selectable languages.

It is a further object of the present invention to provide a versatile display control means which substantially reduces the amount of character generator memory necessary for displaying symbols of several languages.

Still another object of the present invention is to provide a photocomposition machine with a novel control system which relates each of the alpha/numeric keys with a corresponding predetermined symbol in accordance with the language selected by the operator, thereby establishing a keyboard format for the particular language.

It is a further object of the present invention to provide a photocomposition machine with a unique control system which relates each of the alpha/numeric keys with a corresponding position or location of the character storage member utilized for photocomposing.

IN THE DRAWINGS

DESCRIPTION OF THE PREFERRED EMBODIMENT

Figure 1:
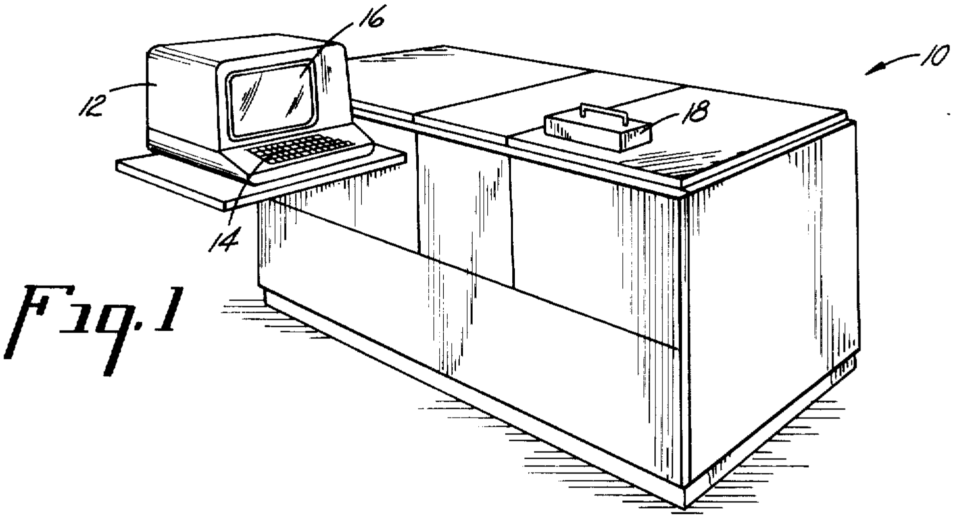
FIG. 1 is a perspective view of a photocomposition machine with a video display associated with the present invention.

Referring now, more particularly, to FIG. 1 of the drawings, a photocomposition machine is illustrated and generally indicated by the numeral 10. The machine includes an input unit 12 comprising an entry keyboard 14 and a cathode ray tube (CRT) display screen 16. A keyboard and display screen are mounted adjacent to each such that the operator may conveniently view both the current and various keyboard entries on the screen. The machine also includes a phototypesetter unit with a cassette 18 for receiving the exposed film or other photosensitive material produced by the typesetting process. The photocomposition machine illustrated in FIG. 1 and operation thereof is disclosed in U.S. Pat. No. 3,968,501 referred to above and incorporated herein for reference. Of course, it is not intended that the display control system of the present invention be limited to this particular photocomposition machine as the present invention may be utilized with various machines, as will be apparent to those skilled in the art.

The control system described herein includes novel means which allows the operator to select any one of a plurality of languages in which the machine is to be operated. Since several languages, such as German, include the unique alpha/numeric characters, the system of the present invention includes means for generating symbols for such unique characters and displaying such on the CRT screen 16. In addition, the relative locations of the alpha/numeric keys may vary from language to language. The system of the present invention accommodates such variations by relating predetermined alpha/numeric characters with specific keys in accordance with the selected language, thereby establishing a keyboard format suitable for that language.

Preferably, the alpha/numeric characters for the photocomposition process are stored on an optically accessible disc, not illustrated. A different disc is provided for each language and is mounted either automatically or manually by the operator. Each disc is formed of an opaque film having alpha/numeric characters and other information defined by transparent patterns and arranged in concentric circles, wherein each circle contains a unique type of font. The disc is also provided with timing marks and width codes located around the circumference. The timing marks and width codes are detected by an appropriate photosensor means, which provides signals to a microprocessor or CPU which controls flashing and focusing of each character.

Figure 2:
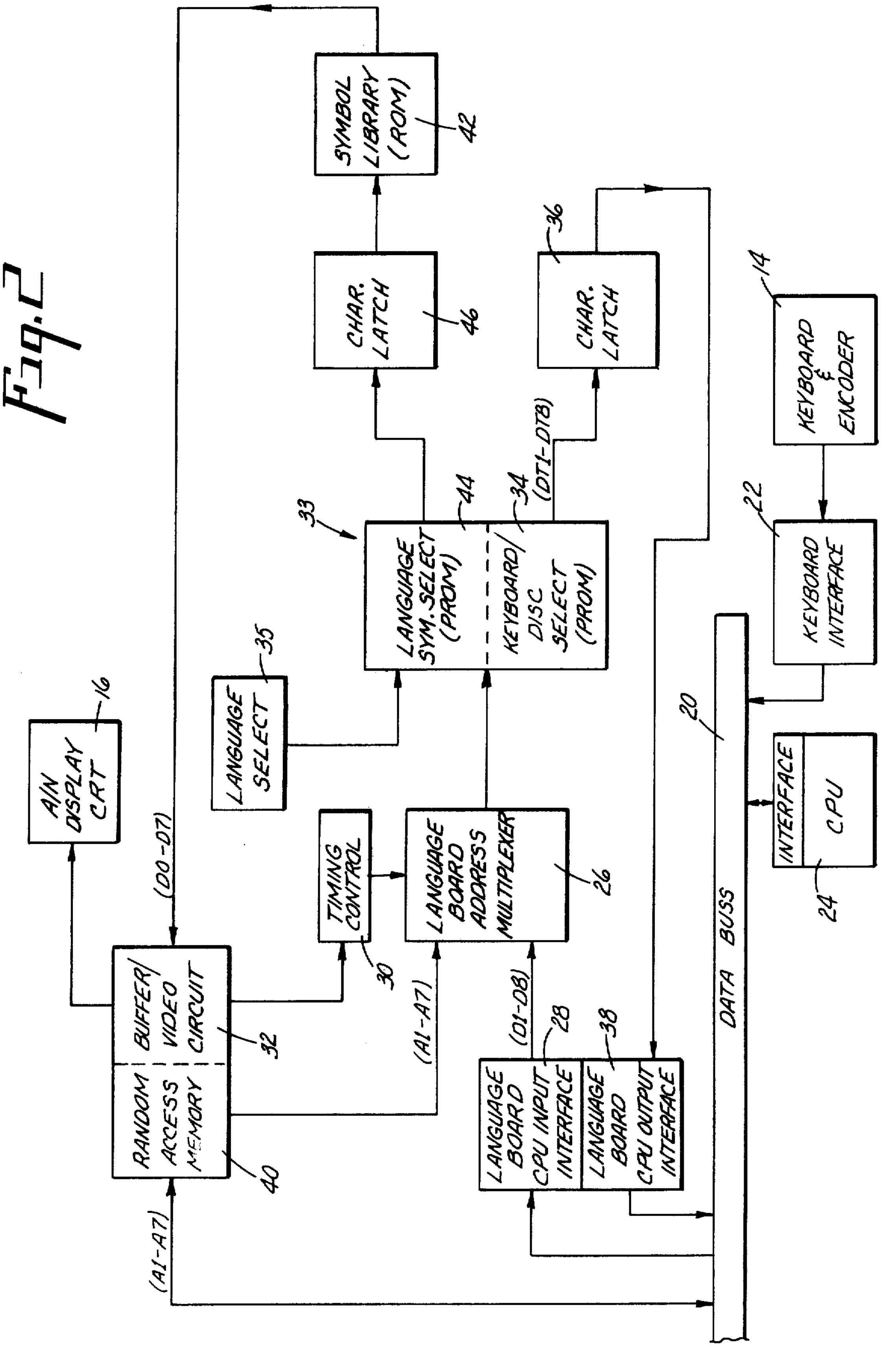
FIG. 2 is a simplified block diagram of the display control of the present invention.

Referring, now, more particularly, to FIG. 2 of the drawings, operation of the display control of the present invention may be understood. The keyboard 14 includes a plurality of keys, approximately 70 in number, with each key corresponding to an alpha/numeric character in accordance with the selected language. Preferably, each key is provided with a HALL effect solid state switch in the form of a magnetically actuated integrated circuit which provides an 8 bit code plus a strobe pulse. The code generated by each key stroke is placed on a data buss 20 through a keyboard interface 22. Each key code is loaded into a data buffer associated with a random access memory (RAM) of a microprocessor or CPU 24.

The CPU is provided with an appropriate program which, among other things, times the handling of data including the key codes loaded into the buffer. Under control of this program, each key code is fed to an address multiplexer 26 by way of data buss 20 and a CPU input interface 28. A timing control 30 associated with the video display circuit 32 directs the key code data D1-D8 to a predetermined set of directory PROMS 34 for the particular language selected through block 33. As hereinafter explained, language selection may be achieved either by operator switches or keys on the keyboard which generate commands through the CPU. In either case, language selection data is provided to the control which serves to select a predetermined set of PROMS or the like which are addressed by the key code data through multiplexer 26.

The directory PROMS generally indicated numeral 33 are divided into two sections for the purposes of describing the operation. The section shown as block 34 relates each key of the keyboard with an associated character symbol for the selected language. This is of particular importance where the keyboard formats vary from language to language. For example, the same key may be utilized for an "A" in English and the letter "B" in the French language. The data, indicated as DT1-DT8, stored in each address location of PROMS 34 defines a particular character symbol which is to be generated and displayed in response to operation of an associated key. In addition, the output from PROMS 34 is utilized to relate each key with a predetermined position of the character storage disc for the selected language. Thus, this output DT1-DT8 may be considered an "internal" code which relates each key to a particular character and disc position. This code is stored momentarily in a character latch register 36 and is forwarded to the CPU through a CPU output interface 38.

The CPU processes the code and reduces such to seven bits, which are then stored in a random access memory 40 utilized to obtain the proper symbol generating data stored in a symbol "library" indicated by block 42. The "library" is comprised of read only memories (ROMS). The 7-bit data, indicated as A1-A7, stored at RAM 40 is utilized to address a group of symbol selection PROM sections indicated by block 44 through the address multiplexer 26. This is overseen by timing control 30. The language selection data or command serves to select a predetermined set of PROMS for the particular language. Each character outputted from a specific PROM location is stored momentarily in a character latch 46 for addressing the symbol "library". Each symbol stored in the "library" ROMS is in the form of 8 data bits (D0-D7) which defines a specific dot pattern for the symbol to be displayed. This dot pattern data is forwarded to a buffer associated with video circuit 32 which operates in a manner described in the above-referenced patent to cause display of the symbol on the CRT display screen 16.

Figure 3:
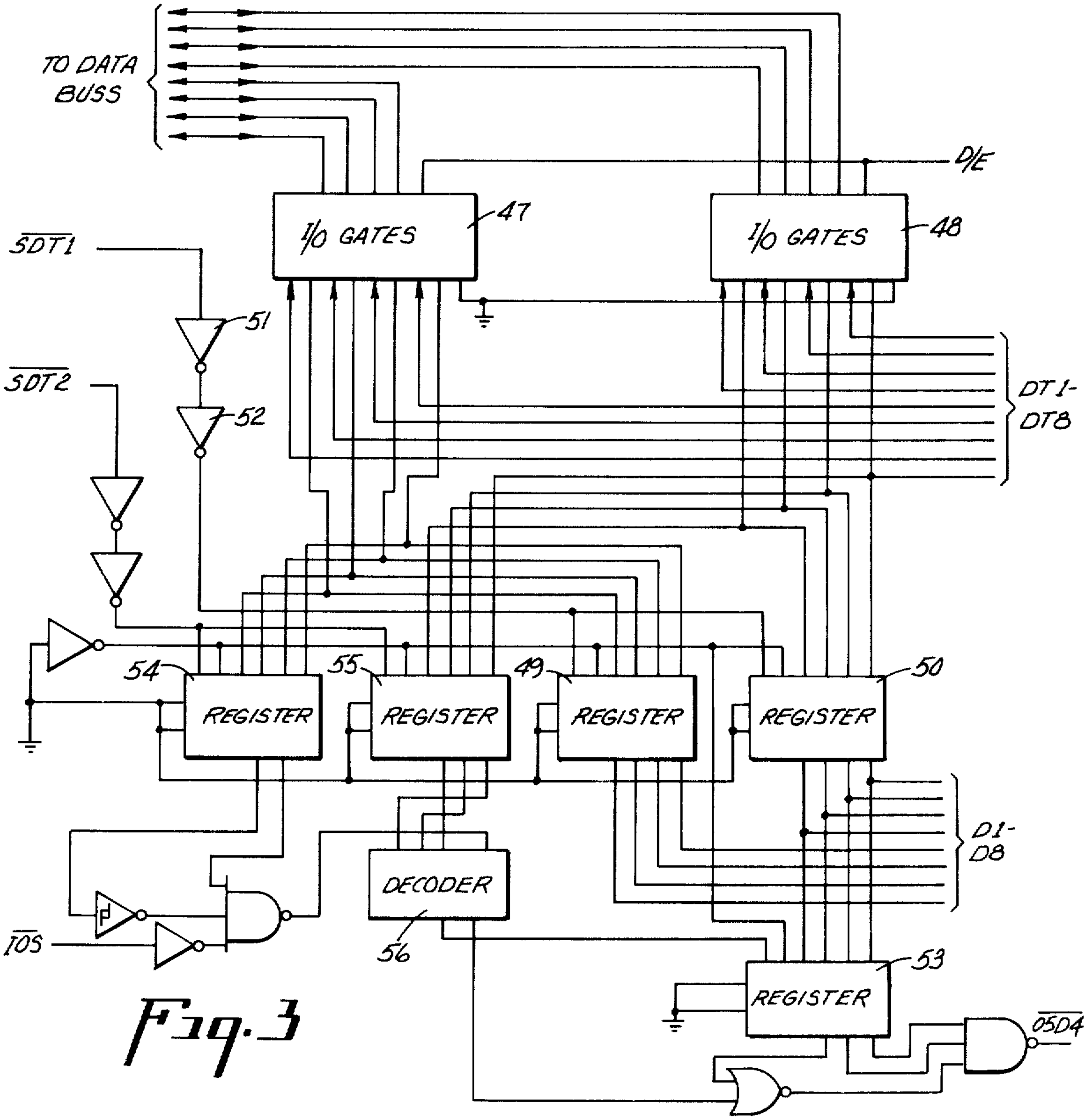
FIG. 3 is a schematic of the input/output interface circuitry associated with the present invention.

Referring to FIG. 3, operation of the CPU interface will be described. All data to and from data buss 20 is handled through a pair of I/O gates 47 and 48. These gates are utilized to pass key code data D1-D8 to the address multiplexer 26 through registers 49 and 50. Gates 47 and 48 may also be utilized to input data to the CPU and are enabled for such operation in accordance with the condition of a DE signal. Data which is fed to the CPU includes a DT1-DT8 which is outputted by the keyboard format selection PROM through character latch 36.

Key code data outputted from the CPU is loaded into registers 49 and 50 upon the occurrence of a data storage signal $\overline{SDT1}$, received through a pair of inverters 51 and 52. It will be appreciated that the four data bits loaded into register 50 are also loaded into a register 53 which is utilized for decoding output instructions from the CPU, as hereinafter explained. When data other than keyboard data is placed on the buss by the CPU, $\overline{SDT1}$, changes, thereby inhibiting entry of such data into registers 49 and 50. Upon the presentation of certain output data to the buss, $\overline{SDT2}$, causes such to be clocked into registers 54 and 56. One such output instruction is $\overline{O5D4}$ which is utilized to clock data into a register shown in FIG. 4. This output instruction occurs as a result of certain data loaded into registers 53, 54 and 55 and handled by a decoder 56 upon the occurrence of an $\overline{IOS}$ signal from the CPU.

Figure 4:
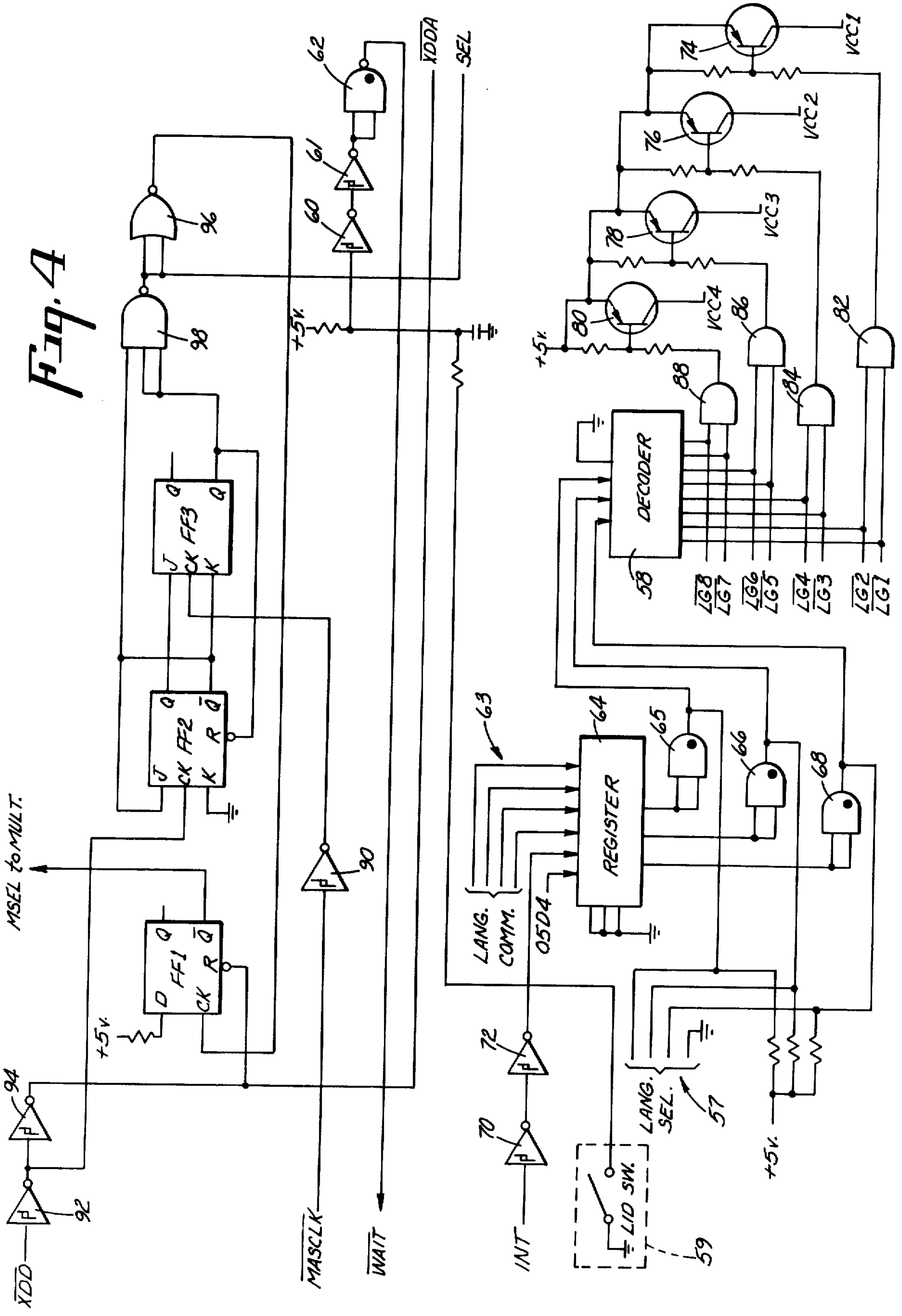
FIG. 4 is a schematic diagram of the language selection and timing logic associated with the present invention.

With reference to FIG. 4, operation of the language selection function and associated timing logic will be described. The preferred embodiment of the present invention as described herein has a capability of selecting from eight different languages and generating corresponding symbols for those languages on the CRT display. The languages may be selected either from an operator's switch or by language commands from the keyboard through the CPU. Inputs from the language selection switch are generally indicated by the numeral 57 and are applied to a language decoder 58 with eight output lines for providing corresponding language signals $\overline{\mathrm{LG1}}$-$\overline{\mathrm{LG8}}$. The signal for the selected language goes LO and is utilized to select a predetermined set of directory PROMS for relating the keys to corresponding character disc positions and to a symbol for the selected language.

In the preferred embodiment, the language selection switch is housed in an enclosure with an access lid and associated switch 59. Inputs from the language selection switch is inhibited by the CPU unless the access lid is closed, which opens switch 59. With the access lid open, a $\overline{\mathrm{WAIT}}$ signal is provided to the CPU through Schmitt trigger inverters 60 and 61 and open collector NAND gate 62.

Provision is also made for effecting the language selection through language commands received from the CPU through lines generally indicated by the numeral 63. These are loaded into a storage register 64 upon receipt of an $\overline{\mathrm{OSD4}}$ signal from circuitry of FIG. 3. The output of register 64 is fed to language decoder 58 through open collector AND gates 65, 66 and 68. Register 64 is cleared by an INT signal from the CPU handled through a pair of Schmitt trigger inverters 70 and 72.

The outputs from language decoder 58 are such that only one line goes LO, corresponding to the selected language. This enables operation of a pair of directory PROMS for the particular language. In the preferred embodiment, there are a total of 16 directory PROMS, with a pair of PROMS for each language. Since the total power consumption is relatively high, it is desirable to de-energize at least some of the PROMS which are not being utilized. In the preferred embodiment, no more than 4 directory PROMS are energized at one time. This is achieved by providing four separate driving voltages VCC1, VCC2, VCC3, and VCC4, by transistors 74, 76, 78 and 80, respectively. A group of AND gates 82, 84, 86 and 88 are provided, each of which controls switching of one of the transistors. It will be appreciated that the output of only one of these gates will be LO at the same time and such is effective to render the corresponding transistor conductive, thereby applying a drive voltage to the corresponding set of PROMS, as hereinafter explained.

Figure 5:
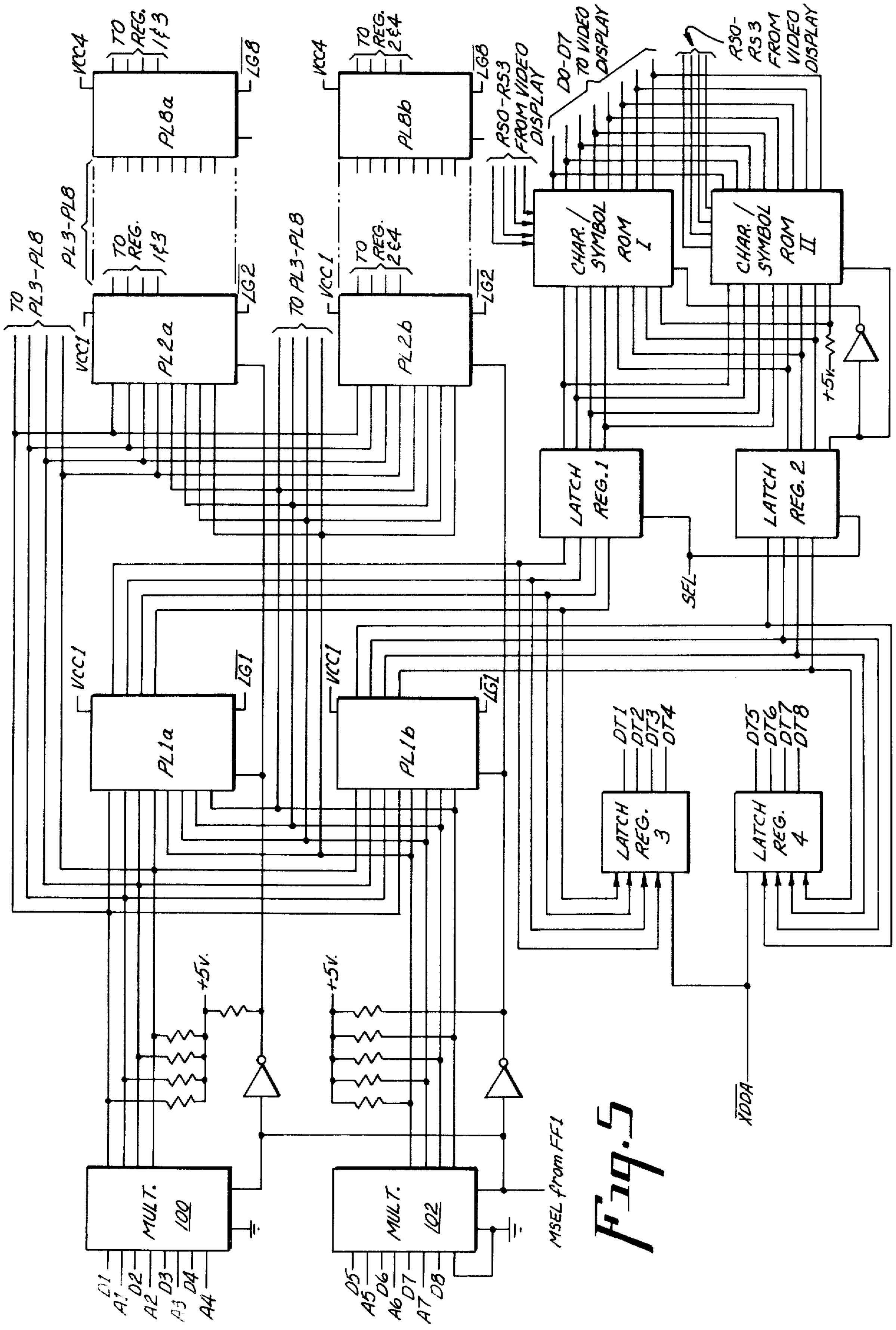
FIG. 5 is a schematic diagram of the language and keyboard selection PROMS and symbol ROMS associated with the character generator.

In order to assure proper handling of the data, various timing signals are provided which are utilized by the logic described in FIG. 5. These signals include $\overline{\mathrm{XDDA}}$ and SEL. Clock signals $\overline{\mathrm{MASCLK}}$ are provided by the CPU and applied to the clock input of a flip flop FF3 through a Schmitt trigger inverter 90. In addition, an $\overline{\mathrm{XDD}}$ signal is provided from the video display circuitry for each data character handled for display purposes. This signal is passed through a pair of Schmitt trigger inverters 92 and 94 and is applied to the reset line of flip flop FF1 and provides $\overline{\mathrm{XDDA}}$ output to the circuitry of FIG. 5. The output of inverter 92 is applied to the clock input of a flip flop FF2. The $\overline{Q}$ output of FF1 is denoted as MSEL which is utilized to control the multiplexers shown in FIG. 4. This signal determines which input data (D1–D8 or A1–A7) is to be utilized to address the directory PROMS (programmable read only memories). In addition, this signal serves to select either the language symbol or keyboard format sections 34 or 44 of the PROMS for the selected language. The clock input to FF1 is provided from a NOR gate 96, the inputs of which are tied together to form an inverter. The inputs are provided from a NAND gate 98 which also provides the SEL signal.

With reference to FIG. 5, operation of the directory PROMS and associated components may be more fully understood. A pair of multiplexers 100 and 102 are provided for handling data D1–D8 and A1–A7 and correspond to block 26 of FIG. 2. As explained above, multiplexing is handled under control of MSEL which alternates the multiplexers between the data lines for D1–D8 and A1–A7. The code generated by operation of each key is comprised of eight data bits which are processed by the CPU input interface 28 and is outputted to the address multiplexers as D1–D8. A pair of directory PROMS is provided for each language, with a total of 16 PROMS for the eight languages. PROMS denoted as PL1*a* and PL1*b* are provided for the first language, while PL2*a* and PL2*b* are provided for the second language and so on. Only six PROMS are illustrated for the sake of simplicity. The PROMS for languages 3 through 7 are not illustrated. It will be appreciated that the first four PROMS, PL1*a*, PL1*b*, PL2*a* and PL2*b* are driven by voltage VCC1, while VCC2 drives the next four and so on.

The control utilizes data D1–D8 to relate each key to a predetermined symbol and character disc position in accordance with the selected language. This conversion or translation is stored in a portion of the PROM set for the selected language. D1–D8 serves to address particular locations in the selected PROMS which results in an eight bit output comprised of four lines from each PROM. When the first language has been selected (LG1) the output of PROM PL1*a* is stored in Latch Registers 1 and 3, while the four bit output from PL1*b* is stored in Latch Registers 2 and 4. $\overline{\mathrm{XDDA}}$ is effective to clock data into registers 3 and 4, while SEL clocks data into registers 1 and 2. Since these signals occur at different times, registers 1 and 2 are alternated with registers 3 and 4 for storage purposes.

The output of registers 3 and 4, denoted as DT1-DT8 serves to relate the particular key code with a symbol and character disc position. As illustrated in FIG. 2, this data is forwarded to the CPU through the output interface 38. At this point, it should be noted that for symbol display purposes, only seven data bits are necessary. The CPU recognizes a DT1–DT8 as symbol display data and processes such to reduce it to seven bits, denoted herein as A1–A7, which is stored in the random access memory at block 40 and FIG. 2. Eventually, this data is passed by multiplexers 100 and 102 and utilized to address the symbol selection portions of the PROMS for the selected language. At this time, the eight bit output from the PROMS is latched into registers 1 and 2 through the occurrence of the SEL clock signal.

Seven of the eight outputs from Latch Registers 1 and 2 are utilized for addressing a pair of character symbol ROMS I and II. The eighth output (on Latch Register 2) is utilized to select which ROM is to be addressed. Thus, one line of the data from the directory PROMS is utilized for enabling or selecting which ROM is to be utilized for generating the video display data. Each ROM has eight output lines providing symbol display data D0–D7 which is fed to a buffer associated with the video display circuitry. The video circuitry operates in a manner which displays each symbol a slice at a time. Thus, each set of dot data D0–D7 outputted by the ROM defines a slice of a symbol to be displayed rather than an entire symbol. Inputs RS0–RS3 from the video display circuitry are effective to select predetermined sections of the ROMS for the particular character slice. Outputting of data from the character symbol ROMS is synchronized by the $\overline{XDD}$ signal from the video display circuitry. A detailed description of the operation of the video display circuitry appears in the above-referenced patent and is incorporated herein by reference. Of course, it is not intended that the present invention be limited to such a video display circuit as other circuits may be utilized as will be apparent to those skilled in the art.

From the foregoing description, it will be appreciated that the control system of the present invention provides a unique means for displaying symbols of different languages, establishing keyboard formats, and relating the keys to character storage disc positions. It is not intended that the present invention be limited to the use of PROMS for directory purposes, as other types of memories, such as ROMS or RAMS may be utilized, if desired. The use of ROMS may be found to be most advantageous from a cost standpoint, where the anticipated volume of machines is substantial. It should also be noted that the specification describes the PROMS as addressing specific ROMS or memory locations for each symbol. In reality, since each symbol is displayed a slice at a time, the dot data for the slices may be actually at different address locations, so that several groups of addresses are required for each symbol.

While the photocomposition machine referred to herein and described in the above referenced U.S. Pat. No 3,968,501 utilizes a disc for character storage purposes, the present invention may be utilized with various types of character storage means or sources. For example, it is foreseeable that optically accessable rotating drums or stationary films may be utilized, or the characters may be stored in the form of data which controls a laser beam or other energy source to form the characters on a photosensitive medium.

It is not intended that the present invention be limited to the specific embodiment disclosed in the above description and associated drawings. Numerous modifications and adaptions of the invention will be apparent to those skilled in the art. Thus, it is intended by the following claims to cover all such modifications and adaptions falling within the true spirit and scope of the invention.

What is claimed is:

1. A display system for a plurality of individually selectable languages, wherein each language has a set of alpha/numeric character symbols, said system comprising means for selecting any one of a plurality of languages and providing corresponding language input signals, keyboard means comprising a plurality of individually operable keys, each providing a corresponding key code, a plurality of symbol generating means, each for producing output signals representative of a corresponding symbol, at least one of said symbol generating means providing output signals for a symbol common to two or more of said plurality of languages, control means including first means for selecting a predetermined set of said symbol generating means in accordance with said language input signals and second means responsive to said key codes for causing operation of the corresponding symbol generating means of the selected set, and display means responsive to said output signals from said symbol generating means, when operated, for providing images of corresponding symbols, whereby symbols for the selected language are displayed in accordance with said operated keys.

2. The system set forth in claim 1 wherein each said set of symbol generating means is substantially unique to its corresponding language.

3. The system set forth in claim 2 wherein said first means includes directory memory means containing data representative of a said set of symbol generating means to be operated for each selectable language.

4. The system set forth in claim 3 wherein each said symbol generating means comprises a symbol memory means containing data corresponding to said output signals for a said symbol.

5. The system set forth in claim 3 wherein said first means includes switching means for energizing the predetermined ones of said directory memory means corresponding to the language selected by said language selection means.

6. The system set forth in claim 5 wherein each said symbol generating means comprises a symbol memory means containing data corresponding to said output signals for said symbols.

7. The system set forth in claim 6 wherein said directory memory means contains data representative of address locations for said symbol memory means.

8. The system set forth in claim 1 wherein said control means includes third means for relating each said key code with a corresponding predetermined symbol in accordance with said language input signals whereby the relative key locations on said keyboard for at least some of said symbols are unique to at least some of said selectable languages.

9. The system set forth in claim 8 wherein said third means includes memory means containing a plurality of keyboard format data sets, each for a said language and relating said key codes with corresponding symbols of a said selected language.

10. The system set forth in claim 9 wherein each said set of symbol generating means is substantially unique to its corresponding language.

11. In a photocomposition machine for recording alpha/numeric characters selected from a keyboard and imaged onto a photosensitive member from character source, a display system for displaying symbols of at least some of the selected characters wherein the symbols are for a language of a plurality of selectable languages, said system comprising:

means for selecting any one of a plurality of languages and providing a corresponding language command, keyboard means comprising a plurality of keys each operable for selecting a character to be recorded and providing a corresponding key code, a plurality of selectable symbol generating means, each for producing output signals representative of a corresponding character symbol, at least one said symbol generating means providing output signals for a symbol common to two or more of said plurality of languages, control means including first means for selecting a predetermined set of said symbol generating means in accordance with said language command and second means for causing operation of a said symbol generating means of the selected set in accordance with a said key code, and display means responsive to said output signals from said symbol generating means, when operated, for providing images of corresponding symbols, whereby symbols for the selected language are displayed in accordance with said operated keys.

12. The system set forth in claim 11 wherein said control means includes third means for relating each said key code with a corresponding character of the character source in accordance with said language input signals whereby the character imaged on the photosensitive member from the source corresponds to the symbol for the operated key.

13. The system set forth in claim 12 wherein said third means includes means for relating each said key code with a corresponding predetermined symbol in accordance with said language input signals whereby the relative key locations on said keyboard for at least some of said symbols are unique to at least some of said selectable languages.

14. The system set forth in claim 13 wherein said third means includes a memory means containing a plurality of keyboard format data sets, each for a said language and relating said key codes with corresponding symbols of a said selected language.

15. The system set forth in claim 14 wherein said first means includes directory memory means containing data representative of a said set of symbol generating means to be operated for each selectable language.

16. The system set forth in claim 15 wherein each said symbol generating means comprises a symbol memory means containing data corresponding to said output signals for a said symbol.

17. The system set forth in claim 16 wherein each said set of symbol generating means is substantially unique to its corresponding language.

* * * * *